United States Patent
Yim et al.

[11] Patent Number: 6,101,309
[45] Date of Patent: Aug. 8, 2000

[54] METHOD FOR DETECTING LEADING AND TRAILING ENDS OF VIDEO TAPE

[75] Inventors: Sang Soo Yim; Jae Seong Han, both of Suwon, Rep. of Korea

[73] Assignee: Samsung Electronics Co., Ltd., Kyungki-do, Rep. of Korea

[21] Appl. No.: 08/884,269

[22] Filed: Jun. 27, 1997

[30] Foreign Application Priority Data

Jun. 27, 1996 [KR] Rep. of Korea ................. 96-24432

[51] Int. Cl.[7] .................................................. H04N 5/91
[52] U.S. Cl. .................... 386/46; 386/68; 386/80; 360/74.4; 360/74.2; 706/20
[58] Field of Search .................... 386/59, 68, 80, 386/46; 360/74.1, 74.4, 74.6, 74.7, 74.2; 242/333, 334.3, 334.4; 706/20; H04N 5/81

[56] References Cited

U.S. PATENT DOCUMENTS

| | | | |
|---|---|---|---|
| 3,912,205 | 10/1975 | Koyama | 242/188 |
| 4,280,159 | 7/1981 | Nakayama | 360/138 |
| 4,528,604 | 7/1985 | Koyama | 360/74.2 |
| 4,632,333 | 12/1986 | Tarpley, Jr. | 242/186 |
| 4,933,781 | 6/1990 | Nishimura et al. | 360/18 |
| 4,965,680 | 10/1990 | Endoh | 360/60 |
| 5,075,812 | 12/1991 | Lee | 360/132 |
| 5,165,069 | 11/1992 | Vitt et al. | 386/46 |
| 5,177,721 | 1/1993 | Cochrane | 369/34 |
| 5,384,668 | 1/1995 | Shih et al. | 360/39 |
| 5,557,483 | 9/1996 | Takahashi | 360/74.6 |
| 5,659,435 | 8/1997 | Han | 360/74.2 |
| 5,699,206 | 12/1997 | Minabe et al. | 360/74.6 |

*Primary Examiner*—Wendy Garber
*Assistant Examiner*—Vincent F. Boccio
*Attorney, Agent, or Firm*—Sughrue, Mion, Zinn, Macpeak & Seas, PLLC

[57] ABSTRACT

A method for detecting the leading and trailing ends of a video tape, which is capable of achieving an accurate detection without using any separate detecting means. The method includes the steps of determining whether or not the video tape runs at a high speed, counting the number of CFG signals for a current revolution of a reel adapted to run the video tape, when it is determined that the video tape runs at a high speed, inputting the counted number of CFG signals to a neural fuzzy function previously extracted in accordance with a learning procedure, thereby determining whether or not the video tape has run to the leading or trailing end thereof, executing a reproduction operation for the video tape when it is determined that the video tape has run to the leading or trailing end thereof, and determining whether or not any signal is reproduced from the video tape during the reproduction operation, and stopping the running of the video tape when it is determined that there is no signal reproduced from the video tape during the reproduction operation.

9 Claims, 8 Drawing Sheets

L : LARGE HUB
S : SMALL HUB

FIG. 5
PRIOR ART

| 1500H | 1700H | 1A00H | 2000H | 2240H | 2300H | 2400H | HUB SIZE DISCRIMINATION VALUE |
|---|---|---|---|---|---|---|---|
| T80 | T100 | T120 | T160 | T180 T200 T10 | T20 | T30 | T45 T60 KIND OF TAPE CASSETTE |

SMALL HUB ——|—— LARGE HUB

METHOD FOR DETECTING LEADING AND TRAILING ENDS OF VIDEO TAPE

BACKGROUND OF THE INVENTION

1. Field of the Invention

The present invention relates to a method for detecting leading and trailing ends of a video tape in a magnetic recording/reproducing apparatus such as a video cassette tape recorder.

2. Description of the Prior Art

Where a video tape runs in a magnetic recording/reproducing apparatus, it should stop its running at its leading or trailing end. If not, high tension is then applied to the video tape due to the drive force of a motor adapted to run the video tape or inertia force generated by the rotation of a hub on which the video tape is wound. In this case, the video tape may be damaged. For example, the tape may be cut or elongated.

Such damage of the video tape becomes more severe when the speed of the video tape is increased.

In order to solve the above-mentioned problem, conventional magnetic recording/reproducing devices are provided with an end detecting means adapted to detect the leading and trailing ends of the video tape of a tape cassette which is loaded in the magnetic recording/reproducing device to record video and audio signals thereon while reproducing those signals.

When the end detecting means detects the leading or trailing end of the video tape, the magnetic recording/reproducing device stops the running of the video tape in response to the detection of the end detecting means so as to prevent the video tape from being damaged.

Such a conventional configuration will now be described in detail in conjunction with FIGS. 1 and 2.

Figure 1:
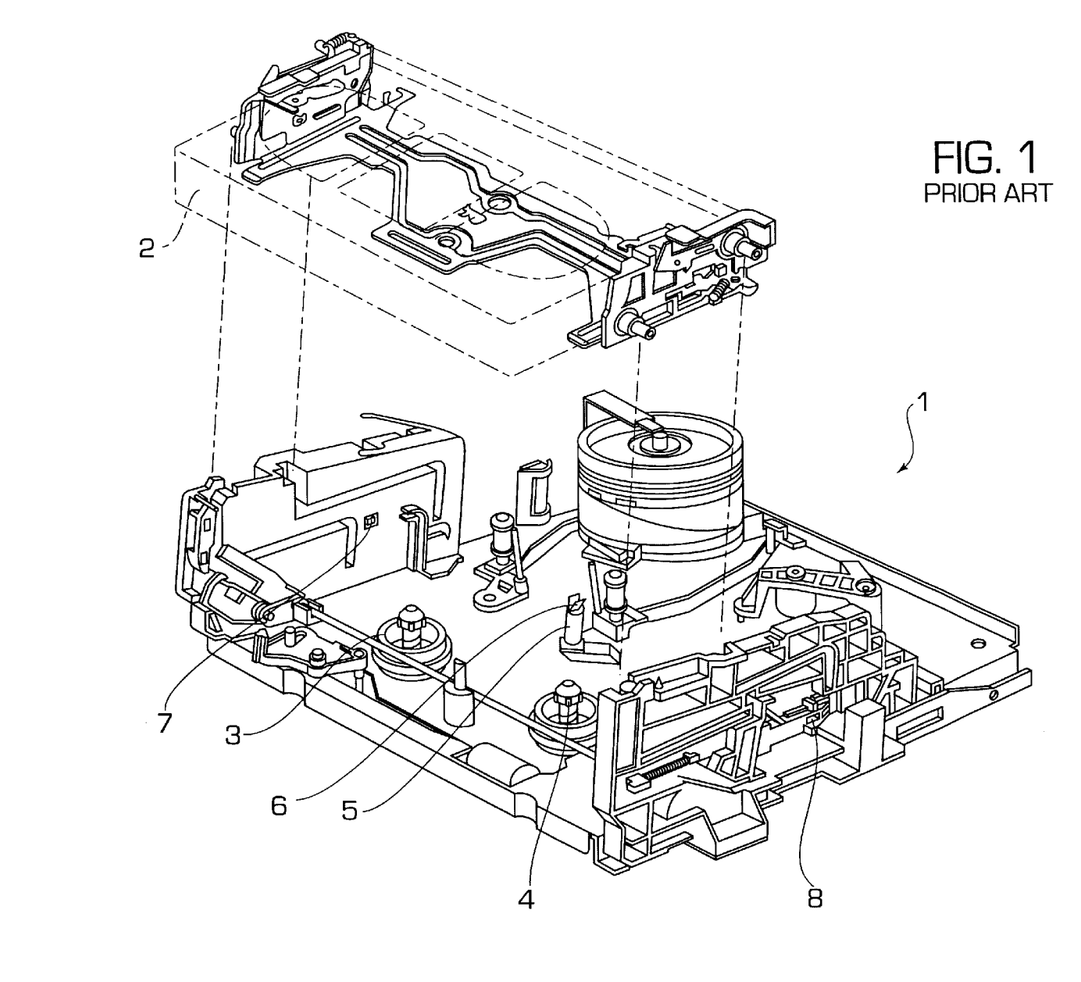
FIG. 1 is a perspective view schematically illustrating the deck unit of a conventional magnetic recording/reproducing apparatus which includes an end detecting means.

FIG. 1 is a perspective view schematically illustrating the deck unit of a conventional magnetic recording/reproducing apparatus which includes an end detecting means.

In FIG. 1, the deck unit is denoted by the reference numeral 1. The reference numeral 2 denotes a tape cassette which is loaded in the deck unit 1 to record video and audio signals thereon while those signals are being reproduced.

The reference numerals 3 and 4 denote a supply reel and a take-up reel respectively fitted in the supply and take-up hubs of the tape cassette 2 when the tape cassette 2 is loaded in the deck unit 1. When the deck unit 1 operates to run the video tape, the supply and take-up reels 3 and 4 rotate, thereby causing the supply and take-up hubs of the tape cassette 2 to rotate.

A vertical support member 5 having a certain height is disposed in the deck unit 1 to the rear of the supply and take-up reels 3 and 4. A light emitting element 6 is mounted on the upper end of the support member 5.

A pair of light receiving elements 7 and 8 are disposed at both side portions of the deck unit 1, respectively. The light receiving element 7 serves to detect the trailing end of the video tape whereas the light receiving element 8 serves to detect the leading end of the video tape.

Figure 2:
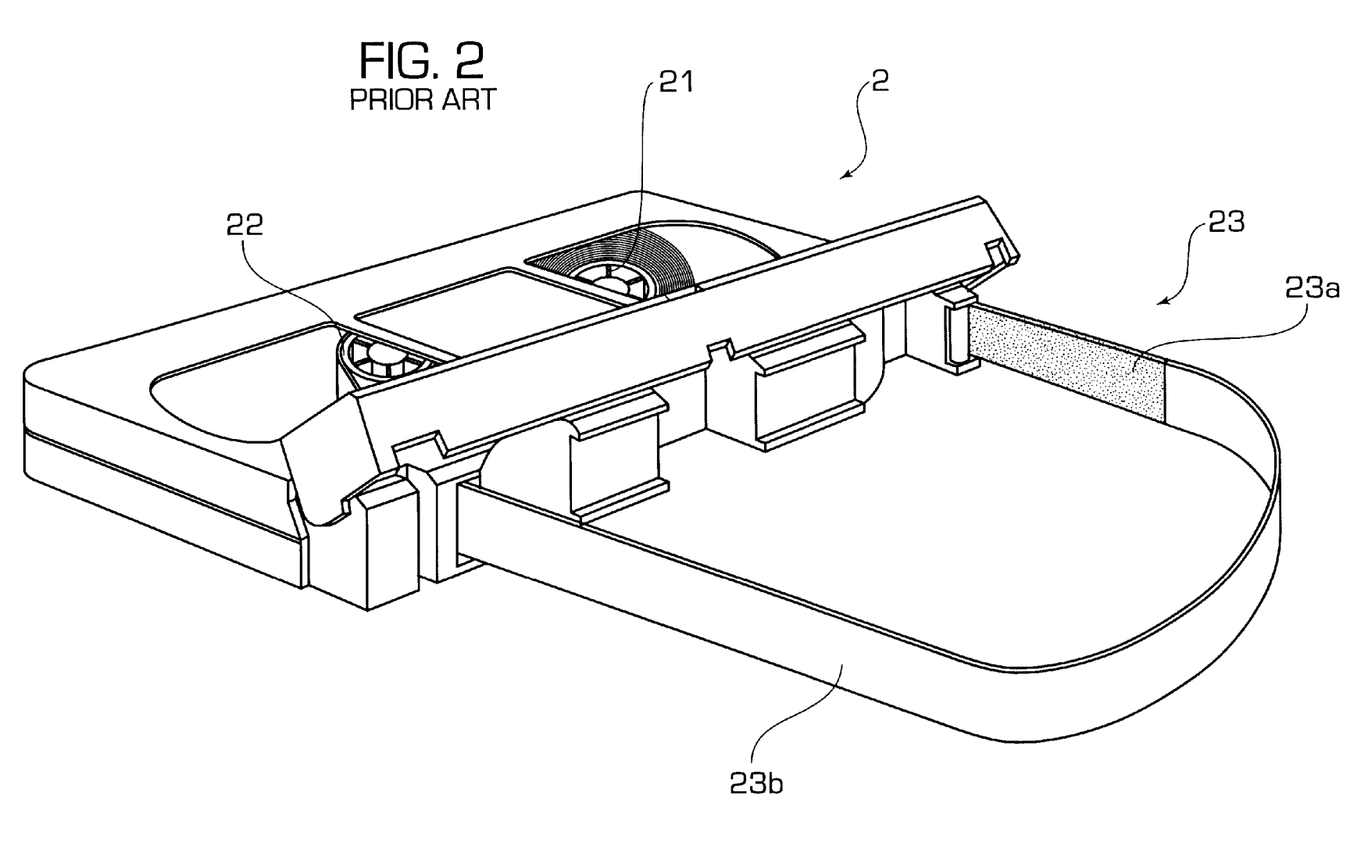
FIG. 2 is a perspective view illustrating a tape cassette which is of a VHS standard.

FIG. 2 is a perspective view illustrating a tape cassette which is of a general video home system (VHS) standard.

In FIG. 2, the tape cassette is denoted by the reference numeral 2. The reference numerals 21 and 22 denote supply and take-up hubs included in the tape cassette 2, respectively. The reference numeral 23 is a video tape wound on the supply and take-up hubs 21 and 22.

The video tape 23 is coated with a magnetic material to record video and audio signals thereon while reproducing those signals. The video tape 23 comprises an opaque magnetic tape 23a and a pair of transparent lead tapes 23b.

The lead tapes 23b are provided at the supply and take-up hubs 21 and 22, respectively. That is, each lead tape 23b is attached at one end thereof to an associated end of the magnetic tape 23a. The lead tapes 23b are also attached at the other ends thereof to the supply and take-up hubs 21 and 22, respectively.

When the tape cassette 2 is loaded in the deck unit 1 of the magnetic recording/reproducing apparatus, the support member 5 and light emitting element 6 are inserted into an insertion groove formed on the lower surface of the tape cassette 2. The supply and take-up reels 3 and 4 are also fitted in the supply and take-up hubs 21 and 22 of the tape cassette 2, respectively.

When the magnetic recording/reproducing apparatus operates in a play-back, fast play-back, reverse play-back, fast forward or rewind mode under the above-mentioned condition, the light emitting element 6 turns on, thereby emitting light beams. The light beams from the light emitting element 6 are directed to the light receiving elements 7 and 8, respectively.

As the supply and take-up reels 3 and 4 rotate, the supply and take-up hubs 21 and 22 rotate, thereby causing the video tape 23 to run.

Where the tape running is carried out at the intermediate portion of the video tape 23, the opaque magnetic tape 23a runs across light beam paths respectively defined between the light emitting element 6 and the associated light receiving elements 7 and 8. As a result, the light beams emitted from the light emitting element 6 are shielded by the magnetic tape 23a, so that they can not be incident on the light receiving elements 7 and 8. In this case, no detect signal is outputted from the light receiving elements 7 and 8.

In this state, a control unit (not shown), which is adapted to control the magnetic recording/reproducing apparatus, discriminates that the leading or trailing end of the video tape 23 has not been detected yet. Accordingly, the control unit controls the magnetic recording/reproducing apparatus to continuously run the video tape 23 in the current operation mode.

Where the tape running is carried out at the trailing end portion of the video tape 23, the associated transparent lead tape 23b runs across the light beam path defined between the light emitting element 6 and light receiving element 7. As a result, the light beam emitted from the light emitting element 6 passes through the transparent lead tape 23b and then enters the light receiving element 7. Accordingly, the light receiving element 7 outputs a trailing end detect signal.

On the other hand, when the tape running is carried out at the leading end portion of the video tape 23, the associated transparent lead tape 23b runs across the light beam path defined between the light emitting element 6 and light receiving element 8. As a result, the light beam emitted from the light emitting element 6 passes through the transparent lead tape 23b and then enters the light receiving element 8. Accordingly, the light receiving element 7 outputs a leading end detect signal.

Based on the trailing end detect signal from the light receiving element 7 or the leading end detect signal from the light receiving element 8, the control unit discriminates that the trailing or leading end of the video tape 23 has been detected.

Accordingly, the control unit controls the magnetic recording/reproducing apparatus to complete the current operation mode while stopping the running of the video tape 23 so as to prevent the video tape from being damaged.

As is apparent from the above description, the conventional configuration includes separate light emitting and receiving elements to detect the leading and trailing ends of the video tape.

The light emitting element is fixedly mounted to the support member upwardly protruded from the intermediate portion of the deck unit whereas the light receiving elements are fixedly mounted to both side portions of the deck unit by means of printed circuit boards, respectively.

Due to such a configuration for mounting the light emitting and receiving elements, the assembling process for the deck unit is complex. This results in an increase in the manufacturing costs and a degradation in productivity.

The conventional magnetic recording/reproducing apparatus should also have an additional light shielding means to prevent external light from entering the light receiving elements. In this case, it is difficult to obtain a compact construction for the deck unit since the deck unit should have a space for such a light shielding means.

As mentioned above, the light emitting and receiving elements are installed in the deck unit in such a manner that light beams emitted from the light emitting element are incident on the light receiving elements via the lead tape portions of the video tape, respectively.

For this reason, the tape cassette is provided with light beam paths for allowing the light beams emitted from the light emitting element to enter the light receiving elements via the lead tape portions of the vide tape, respectively.

Generally, the video tape wound on the hubs of the tape cassette may have various lengths in accordance with the type of the tape cassette based on the total running time in a normal running mode. For example, tape cassettes are classified into those for 10 minutes, 20 minutes, 30 minutes, 45 minutes, 60 minutes, 80 minutes, 100 minutes, 160 minutes, 180 minutes and 200 minutes.

For such tape cassettes, two standard hub sizes are used. That is, a hub having a large diameter of 31.02 mm is used for tape cassettes for 10 minutes, 20 minutes, 30 minutes, 45 minutes and 60 minutes. A smaller-size hub having a diameter of 13.06 mm is used for tape cassettes for 80 minutes, 100 minutes, 160 minutes, 180 minutes and 200 minutes.

There is a rule for the maximum diameter of the wound video tape in the case in which the smaller-size hub is used. In accordance with the rule, the maximum diameter of the wound video tape should be equal to or smaller than the diameter of the larger-size hub, namely, 31.02 mm.

For this reason, tape cassettes for a longer running time use a thinner video tape.

For instance, tape cassettes for 120 minutes use a video tape having a thickness of about 20 $\mu$m, tape cassettes for 160 minutes use a video tape having a thickness of about 16 $\mu$m, tape cassettes for 180 minutes use a video tape having a thickness of about 15 $\mu$m, and tape cassettes for 210 minutes use a video tape having a thickness of about 14 $\mu$m, so that the maximum diameter of the video tape in a wound state is equal to or smaller than 31.02 mm.

Meanwhile, magnetic recording/reproducing devices are provided with a capstan motor. In an operation mode for recording or reproducing video and audio signals, the capstan motor drives to run the video tape.

In a standard play (SP) mode, the capstan motor serves to run the video tape at a speed of 33.35 mm/sec.

A signal detecting means such as a Hall sensor is disposed at an appropriate position in the vicinity of the capstan motor. When the capstan motor drives, the signal detecting means detects the rotation of the capstan motor, thereby generating a capstan frequency generator (CFG) signal.

The CFG signal has a frequency of 1,080 Hz when the video tape runs in the SP mode. In an SLP mode, the CFG signal has a frequency of 360 Hz.

A number of research efforts are being made to discriminate the hub size of tape cassettes using the above-mentioned tape cassette standards and CFG signals, thereby discriminating the leading and trailing ends of the video tape.

In accordance with techniques in which the hub size is discriminated without using any detecting means, one revolution of each of the supply and take-up reels is detected during the running of the video tape. In this case, the number of CFG signals generated for one revolution of each of the supply and take-up reels is counted. Based on the counted values, the discrimination value for the hub size is calculated using the following equation (1):

$$Pc^2 = Ps^2 + Pt^2 \qquad \text{[Equation 1]}$$

where, "Pc$^2$" represents the discrimination value for the hub size; "Ps" represents the number of CFG signals generated for one revolution of the supply reel; and "Pt" represents the number of CFG signals generated for one revolution of the take-up reel.

The discrimination value for the hub size, Pc$^2$, in the equation (1) is constant irrespective of the running condition of the video tape.

Now, the reason why the discrimination value for the hub size, Pc$^2$, is constant will be described.

Figure 3:
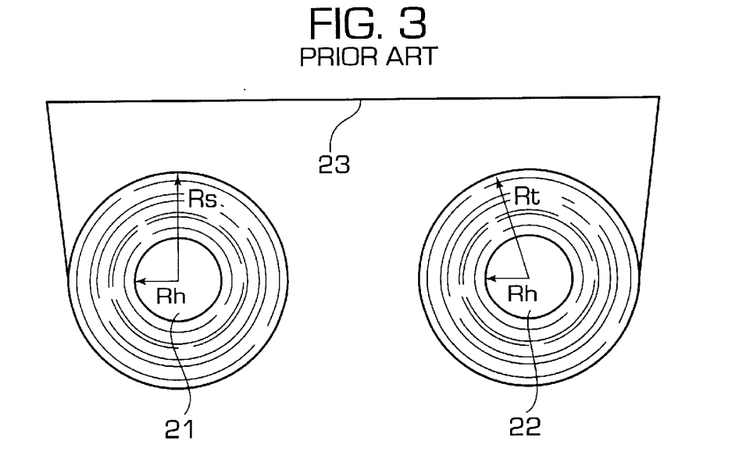
FIG. 3 is a schematic view for explaining a conventional method for discriminating the hub size.

First, it is assumed that, in the case of a tape cassette shown in FIG. 3, "Rh" represents the radius of each of the supply and take-up hubs 21 and 22, "Rs" represents the radius of the video tape 23 wound on the supply hub 21, and "Rt" represents the radius of the video tape 23 wound on the take-up hub 22.

In this case, the total area of the video tape wound on both the supply and take-up reels 21 and 22 can be calculated as expressed by the following equation (2):

$$S = "Rs^2 + "Rt^2 - 2"Rh^2 \qquad \text{[Equation 2]}$$

where, "S" represents the total area of the video tape wound on the supply ("Rs) and take-up reels 21 and 22; and "2"Rh$^2$" represents the sum of the area of the supply hub 21 and the area of the take-up hub 22.

The total length of the video tape 23 can be calculated by dividing the total area S of the video tape 23 derived from the equation (2) by the thickness of the video tape 23, as expressed by the following equation (3):

$$L = ("Rs^2 + "Rt^2 - 2"Rh^2)/Td$$

$$= "(Rs^2 + Rt^2 - 2Rh^2)/Td \qquad \text{[Equation 3]}$$

where, "L" represents the total length of the video tape 23; and "Td" represents the thickness of the video tape 23.

Among distance, speed and time, a relationship expressed by "speed=distance/time" is generally established. Based on such a relationship, the total running time of the video tape 23 at a constant running speed can be calculated as expressed by the following equation (4):

$$T = L/Vo$$

$$= \{"/(Td \times Vo)\} \times (Rs^2 + Rt^2 - 2Rh^2) \qquad \text{[Equation 4]}$$

where,

"T" represents the total running time of the video tape 23; and

"Vo" represents the running speed of the video tape 23.

The circumference of the video tape 23 wound on each of the supply and take-up hubs 21 and 22 at a certain running time point can be calculated as expressed by the following equation (5):

$$Cs=2"Rs=Vo\times Ts=Vo\times Ps/F$$

$$Ct=2"Rt=Vo\times Tt=Vo\times Pt/F \quad \text{[Equation 5]}$$

where,

2 "Cs" represents the circumference of the video tape 23 wound on the supply hub 21;

"Ct" represents the circumference of the video tape 23 wound on the take-up hub 21;

"Ps" represents the number of CFG signals generated for one revolution of the supply reel;

"Pt" represents the number of CFG signals generated for one revolution of the take-up reel; and "F" represents the frequency of the CFG signal.

From the equation (5), the radius Rs of the video tape 23 wound on the supply hub 21 and the radius Rt of the video tape 23 wound on the take-up hub 22 can be derived as expressed by the following equation (6):

$$Rs=(Vo\times Ps)/(2"F)$$

$$Rt=(Vo\times Pt)/(2"F) \quad \text{[Equation 6]}$$

When the equation (6) is substituted for the equation (4), the total running time of the video tape 23 can be calculated as expressed by the following equation (7):

$$T=\{"/(Td\times Vo)\}\times\{(Vo/2"F)^2\times(Ps^2+Pt^2)-2Rh^2\}$$

$$=\{Vo/(Td\times 4"F^2)\}\times(Ps^2+Pt^2)-\{2Rh^2/(Td\times Vo)\} \quad \text{[Equation 7]}$$

The values "Td×4"F²" and "2Rh²/(Td×Vo)" in the equation (7) are constant irrespective of the running condition of the video tape.

Since the value "T" in the equation (7), namely, the total running time of the video tape 23, is also constant, the value "Pc²" in the equation (1) (Pc²=Ps²+Pt²) is constant.

In accordance with the above-mentioned principle, the discrimination value for the hub size, Pc², is calculated, as expressed in the equation (1), using the number of CFG signals, Ps, generated for one revolution of the supply reel and the number of CFG signals, Pt, generated for one revolution of the take-up reel.

Based on the calculated hub size discrimination value Pc², a retrieval of data previously stored is then executed to discriminate the hub size.

Figure 4:
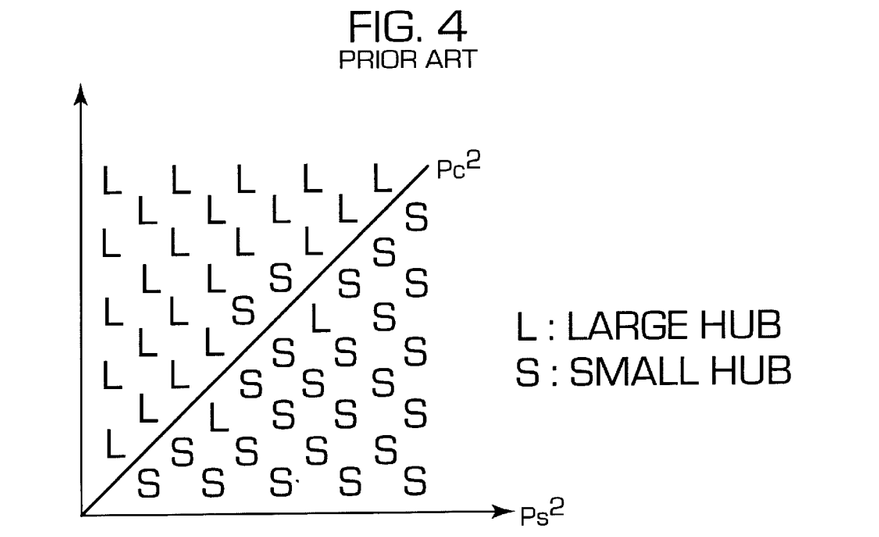
FIG. 4 is a graph illustrating kinds of tape cassettes depending on different hub sizes discriminated in accordance with the conventional method.

For example, the discrimination of the hub size is achieved using the graph of FIG. 4 which shows the relation between "Ps2" and "Pt²". When the calculated hub size discrimination value is larger than a discrimination reference value ("Pc²" in FIG. 4), the hub size is discriminated as a large hub size. On the other hand, when the calculated hub size discrimination value is smaller than a discrimination reference value, the hub size is discriminated as a small hub size.

Figure 5:
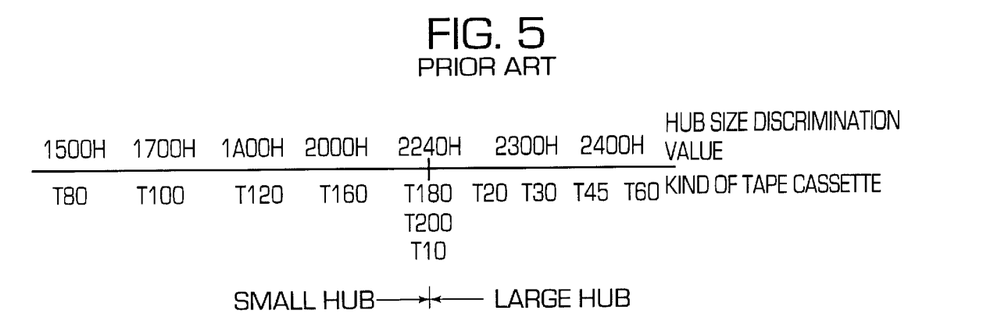
FIG. 5 is a table illustrating kinds and hub sizes of tape cassettes depending on different hub size discrimination values in is accordance with the conventional method.

FIG. 5 illustrates kinds and hub sizes of tape cassettes depending on different hub size discrimination values Pc².

In FIG. 5, the hub size discrimination values Pc² are expressed in hexadecimal form. "T10", "T20", "T30", "T45", "T60", "T80", "T100", "T120", "T160", "T180", and "T200" represent tape cassettes for 10 minutes, 20 minutes, 30 minutes, 45 minutes, 60 minutes, 80 minutes, 100 minutes, 160 minutes, 180 minutes and 200 minutes, respectively.

Based on the discriminated hub size, the rotating speed of each reel in the current operation mode is determined. Using the determined rotating speeds of the reels, a detection for the leading and trailing ends of the video tape is carried out.

The rotating speed of each reel varies depending on the amount of the video tape wound on the associated hub. Based on this fact, the conventional techniques determine whether or not the rotating speed of each reel is equal to or less than a predetermined reference value. When the rotating speed of each reel is equal to or less than a predetermined reference value, it is discriminated that the leading or trailing end of the video tape is detected, thereby stopping the running of the video tape.

However, such conventional methods involve a lot of errors in detecting the leading and trailing ends of the video tape. The conventional methods may erroneously determine the running position of the video tape. For example, the running position of the video tape may be erroneously determined as the leading or trailing end of the video tape, even though it corresponds to the intermediate portion of the video tape. In this case, the running of the video tape is erroneously stopped. Even when the video tape reaches its leading or trailing end, it may run continuously. In this case, the video tape may be damaged.

SUMMARY OF THE INVENTION

Therefore, an object of the invention is to provide a method for detecting the leading and trailing ends of a video tape, which method is capable of achieving an accurate detection.

Another object of the invention is to provide a method for detecting the leading and trailing ends of a video tape, in which the leading and trailing ends of the video tape are accurately detected using signals reproduced from the video tape even when a detection error is generated at a high running speed of the video tape.

Another object of the invention is to provide a method for detecting the leading and trailing ends of a video tape, in which the leading and tailing ends of the video tape are accurately detected using signals reproduced from the video tape.

In order to accomplish these objects, in accordance with the present invention, a method for detecting the leading and trailing ends of a video tape is provided, wherein the number of CFG signals generated for one revolution of a hub, on which the video tape is wound, is counted for different amounts of the wound video tape, respectively.

The counted values are then inputted to a neural fuzzy algorithm, thereby extracting a neural fuzzy function in accordance with a learning procedure.

Where the video tape runs at a high speed, a counting operation is carried out to count the number of CFG signals generated for the current one revolution of the reel, the number of CFG signals generated for one revolution of the reel preceding the current one revolution of the reel by one revolution, and the number of CFG signals generated for one revolution of the reel preceding the current one revolution of the reel by two revolutions. All the counted numbers of CFG signals are inputted to the extracted neural fuzzy function, thereby detecting whether or not the video tape has run to its leading or trailing end.

Where it is determined whether or not the video tape has run to its leading or trailing end, as mentioned above, there may be a detection error corresponding to about 10 turns of the video tape wound on the hub.

Therefore, in accordance with the method of the present invention, when the video tape has run to its leading or trailing end, it is determined whether or not there is any signal reproduced from the video tape while executing the reproduction operation for the video tape. That is, the video tape runs until there is no reproduced signal. The running of the video tape is stopped when there is no reproduced signal.

During the reproduction operation for the video tape, the running of the video tape to its leading or trailing end is determined in accordance with whether or not there is any signal reproduced from the video tape. In this case, the running of the video tape is stopped when there is no reproduced signal.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Hereinafter, a method for detecting the leading and trailing ends of a video tape in accordance with the present invention will be described in conjunction with FIGS. 6 to 9.

Figure 6:
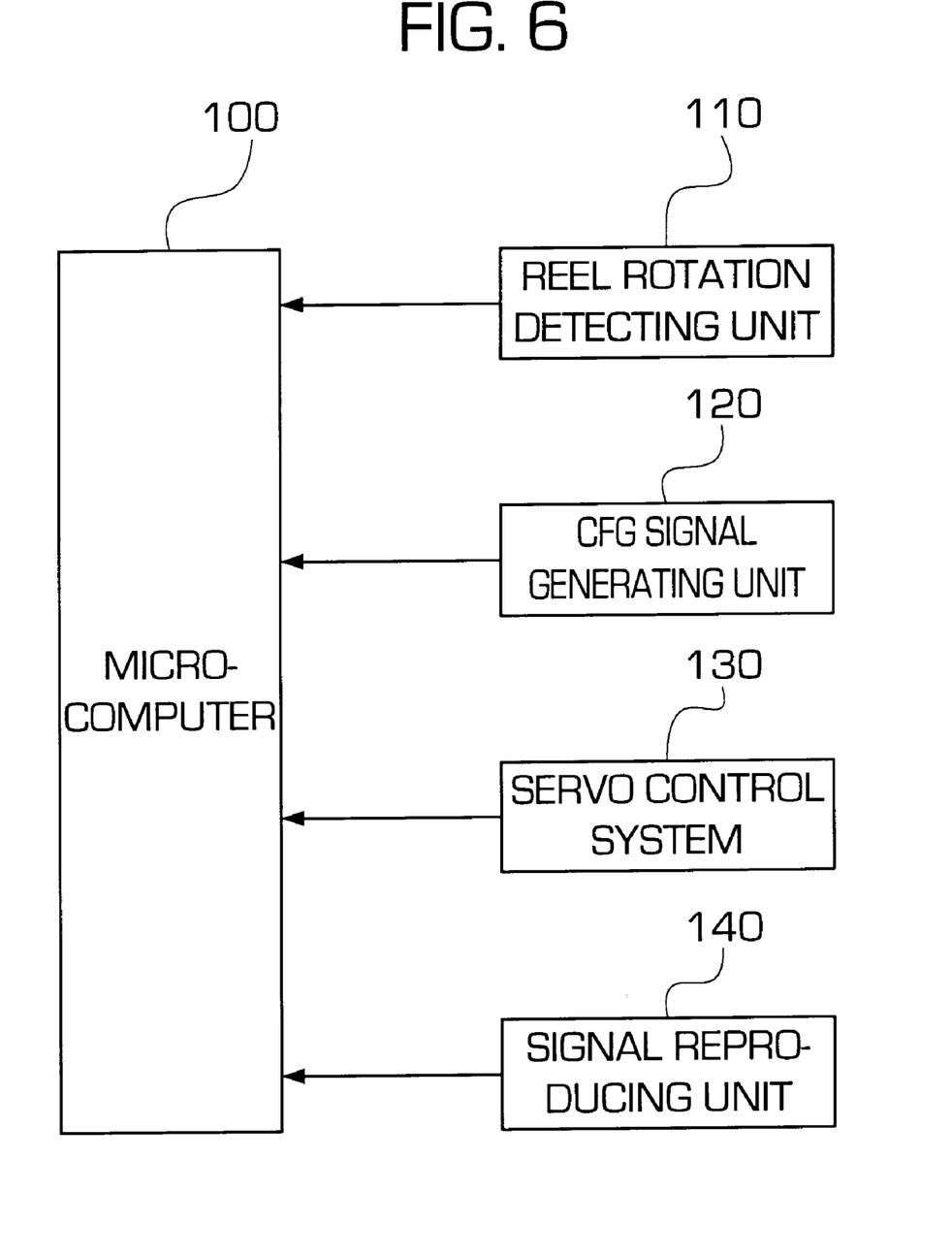
FIG. 6 is a block diagram illustrating the configuration of a magnetic recording/reproducing apparatus to which the detection method of the present invention is applied.

FIG. 6 is a block diagram illustrating the configuration of a magnetic recording/reproducing apparatus to which the detection method of the present invention is applied.

In FIG. 6, the reference numeral 100 denotes a microcomputer for controlling the operation of the magnetic recording/reproducing apparatus and determining the leading and trailing ends of the video tape, thereby stopping the running of the video tape.

The reference numeral 110 denotes a reel rotation detecting unit for detecting the rotation of supply and take-up reels and sending a reel rotation detect signal to the microcomputer 100 when the supply and take-up reels rotate one revolution.

The reference numeral 120 denotes a CFG signal generating unit for generating a CFG signal when a capstan motor drives and for sending the generated CFG signal to the microcomputer 100.

The reference numeral 130 denotes a servo control system for servo-controlling a deck unit of the magnetic recording/reproducing apparatus under the control of the microcomputer 100, thereby running the video tape.

The reference numeral 140 denotes a signal reproducing unit for reproducing video, audio and control signals recorded on the video tape during the running of the video tape under the control of the servo control system 130 and sending the reproduced signals to the microcomputer 100.

Figure 7:
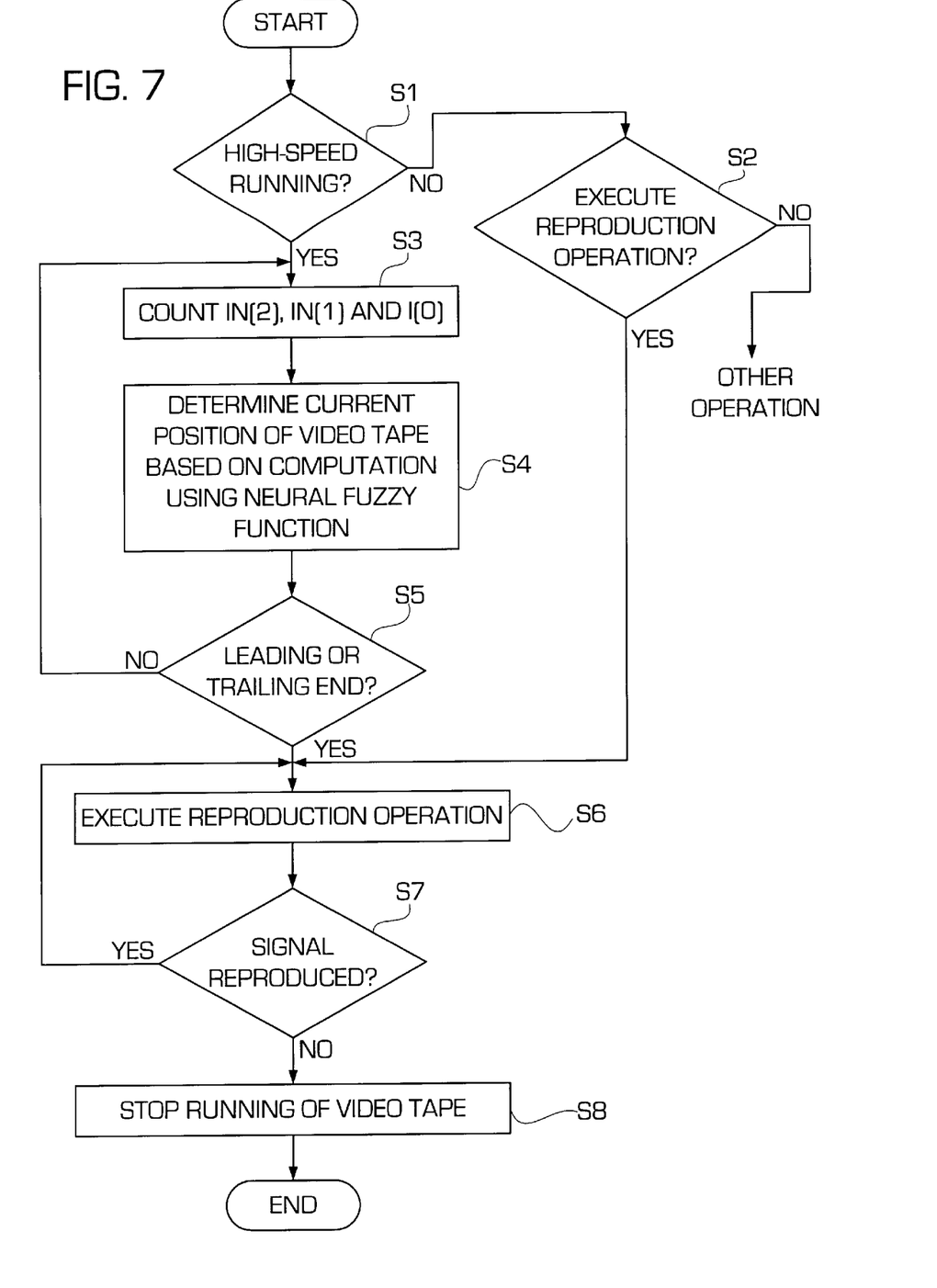
FIG. 7 is a flow chart illustrating a detection method according to the present invention.

In accordance with the detection method of the present invention which is applied to the magnetic recording/reproducing apparatus having the above-mentioned configuration, it is determined at step S1 whether or not the video tape runs at a high speed. When it is not determined at step S1 that the video tape runs at a high speed, it is determined at step S2 whether or not a reproducing operation is carried out.

Here, the high-speed running of the video tape includes all operation modes in which only the video tape runs while reproducing no signal recorded thereon, as in the fast forward or rewinding mode.

The reproducing operation includes all operation modes in which a reproduction of signals is carried out while the video tape runs forwardly or reversely. For example, the reproducing operation includes the reproducing mode, in which the reproduction of signals is carried out while the video tape runs forwardly, as in the normal-speed play or forward search mode, and the reproducing mode, in which the reproduction of signals is carried out while the video tape runs reversely, as in the reverse play or reverse search mode.

Where it is determined at step S1 that the video tape runs at a high speed, the microcomputer 100 detects one revolution of a reel from an output signal generated from the reel rotation detecting unit 110.

At step S3, the microcomputer 100 counts the number of CFG signals, IN(2), generated from the CFG signal generating unit 120 for the current one revolution of the reel, the number of CFG signals, IN(1), generated from the CFG signal generating unit 120 for one revolution of the reel preceding the current one revolution of the reel by one revolution, and the number of CFG signals, IN(0), generated from the CFG signal generating unit 120 for one revolution of the reel preceding the current one revolution of the reel by two revolutions.

Where the video tape runs forwardly at a high speed, the counting is carried out for CFG signals generated from the supply reel. Where the video tape runs reversely at a high speed, the counting is carried out for CFG signals generated from the take-up reel.

Once the values of CFG signals, IN(2), IN(1) and IN(0), are counted at steps S3, computations are performed using a neural fuzzy function at step S4, thereby determining the current position of the video tape.

Figure 8A:
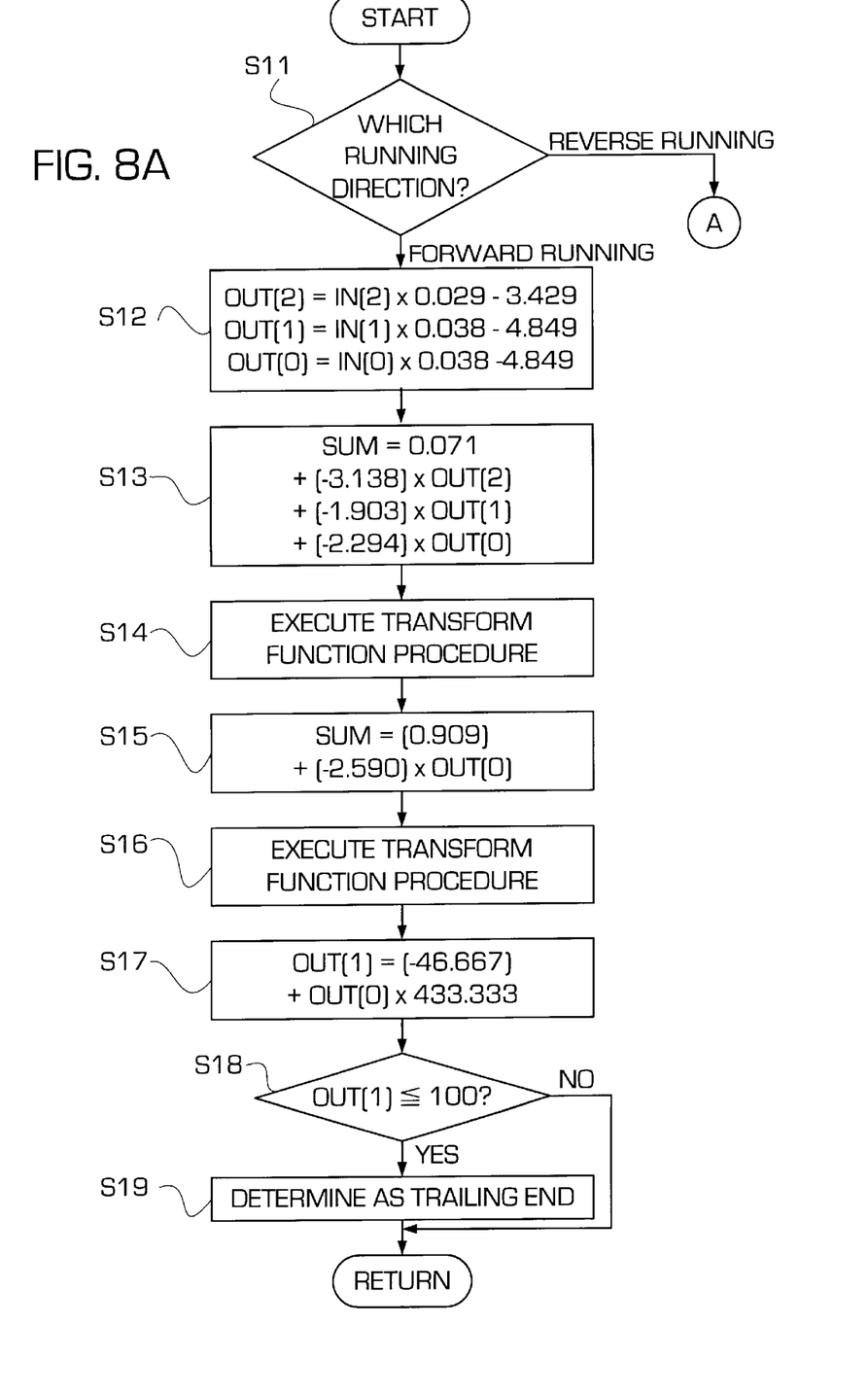
FIGS. 8a and 8b are flow charts respectively illustrating the procedure of discriminating the leading or trailing end of the video tape, based on the result of a computation carried out in the procedure of FIG. 7 using a neural fuzzy function in accordance with the present invention.

FIG. 8a is a flow chart illustrating the procedure of determining the current position of the video tape, based on the result of the computations performed using the neural fuzzy function.

As shown in FIG. 8a, it is first determined at step S11 whether the running direction of the video tape is a forward direction or a reverse direction.

Where it is determined that the video tape runs forwardly, output values OUT(2), OUT(1) and OUT(0) are derived at step S12 using the counted values IN(2), IN(1) and IN(0) derived at step S3.

That is, the output value OUT(2) is derived by calculating "IN(2)×0.029−3.429". The output value OUT(1) is derived by calculating "IN(1)×0.038−4.849". The output value OUT(0) is derived by calculating "IN(0)×0.038−4.849".

Based on the output values OUT(2), OUT(1) and OUT(0) derived at step S12, a calculation is then carried out at step S13 to derive the sum of "0.071+(−3.138)×OUT(2)+(−1.903)×OUT(1)+(−2.294)×OUT(0)".

Figure 9:
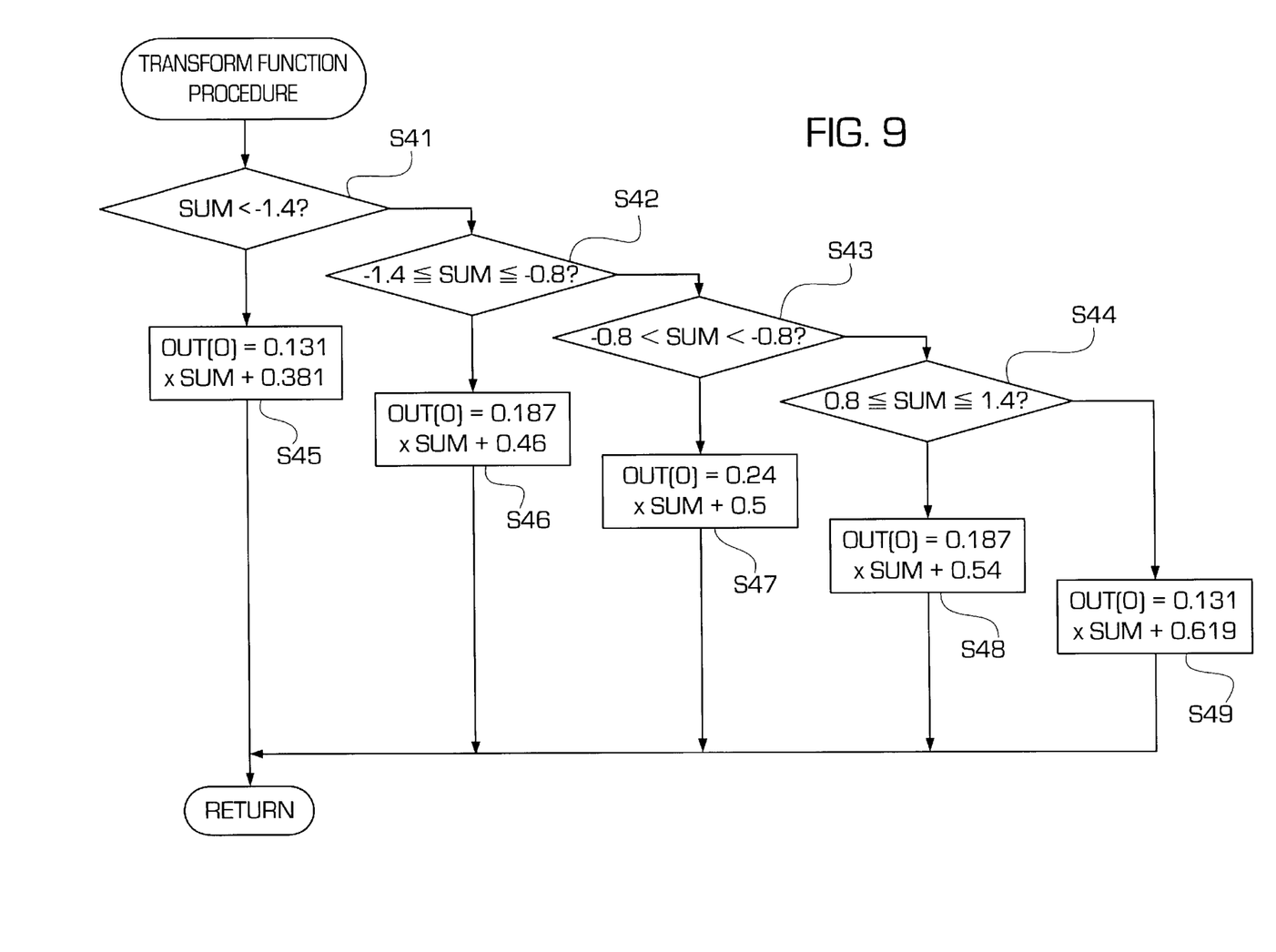
FIG. 9 is a flow chart illustrating a transform function procedure involved in the procedure of FIG. 8.

After the sum is calculated at step S13, a transform function procedure is executed, based on the calculated sum, as shown in FIG. 9. That is, the value of the sum is first determined at steps S41 to S44.

When it is determined at step S41 that the sum is less than −1.4 (SUM<−1.4), the output value OUT(0) is derived at step S45 by calculating "0.131×SUM+0.381". When it is determined at step S42 that the sum is not less than −1.4, but not more than −0.8 (−1.4≦SUM≦−0.8), the output value OUT(0) is derived at step S46 by calculating "0.187×SUM+0.46".

Where it is determined at step S43 that the sum is more than −0.8, but less than 0.8 (−0.8<SUM<0.8), the output value OUT(0) is derived at step S47 by calculating "0.24×SUM+0.5". Where it is determined at step S44 that the sum is not less than −0.8, but not more than 1.4 (−0.8≦SUM≦1.4), the output value OUT(0) is derived at step S48 by calculating "0.187×SUM+0.54". When it is determined at step S44 that the sum is more than 1.4 (1.4<SUM), the output value OUT(0) is derived at step S49 by calculating "0.131×SUM+0.619".

After completing the above transform function procedure, the determination procedure returns to step S15. At step S15, the sum is derived again by calculating "0.909+(−2.590)×OUT(0)" based on the derived output value OUT(0).

At step S16, the above-mentioned transform function procedure is executed again to derive an output value for OUT(0). Thereafter, a final output value for OUT(1) is derived at step S17 by calculating "(−46.667)+OUT(0)×433.333" based on the derived output value OUT(0).

Figure 8B:
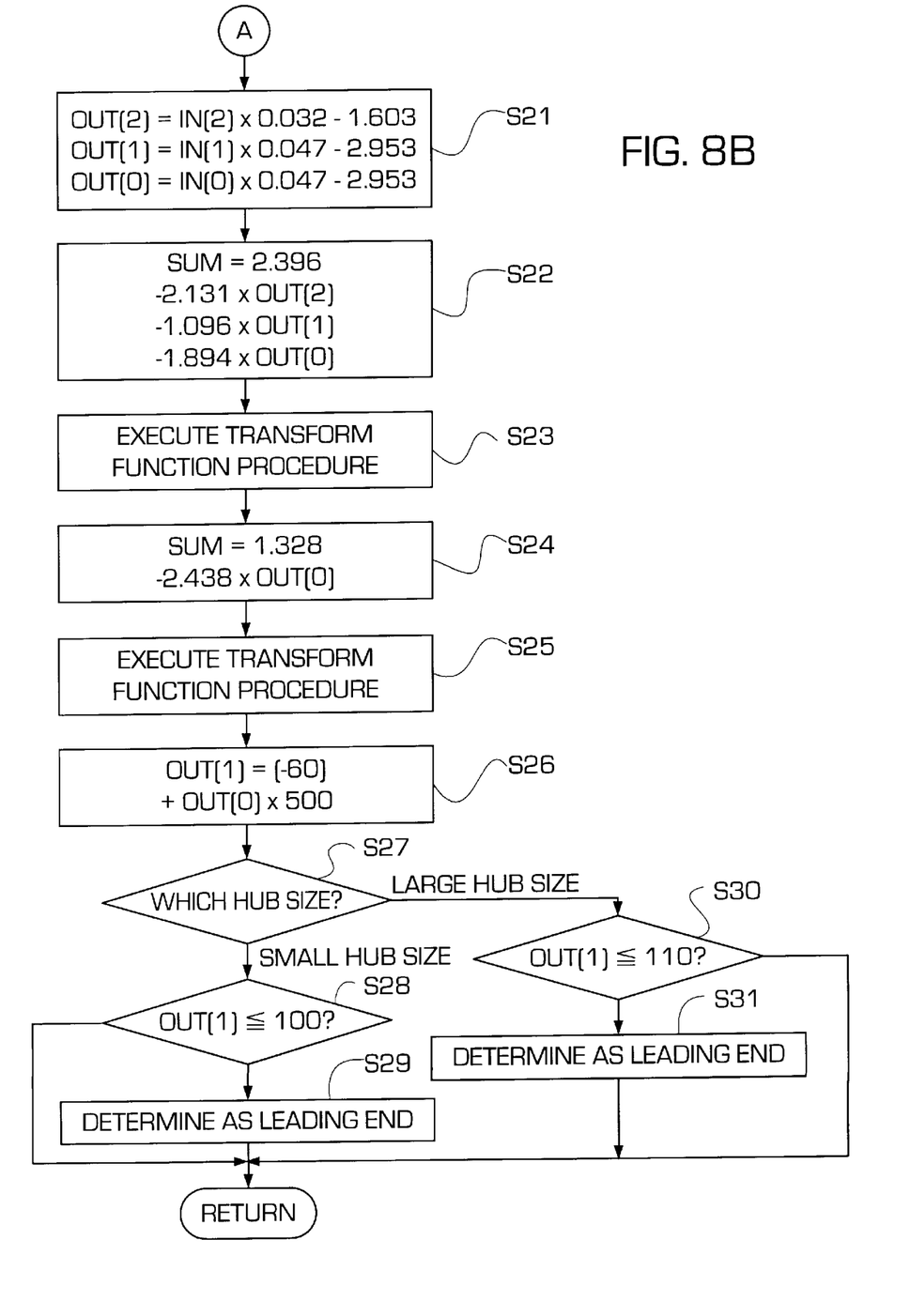

After obtaining the final output value for OUT(1), it is determined at step S18 whether or not the final output value for OUT(1) is not more than 100 (OUT(1)≦100). Where the final output value for OUT(1) is not more than 100, it is determined at step S19 that the current position of the video tape corresponds to the trailing end of the video tape. The determination procedure then returns to step S5 (FIG. 7).

Where it is determined at step S11 of FIG. 8a that the video tape runs reversely, output values OUT(2), OUT(1) and OUT(0) are derived at step S21 using the counted values IN(2), IN(1) and IN(0) derived at step S3.

That is, the output value OUT(2) is derived by calculating "IN(2)×0.032−1.603". The output value OUT(1) is derived by calculating "IN(1)×0.047−2.953". The output value OUT(0) is derived by calculating "IN(0)×0.047−2.953".

Based on the output values OUT(2), OUT(1) and OUT(0) derived at step S21, a calculation is then carried out at step S22 to derive the sum of "2.396+(−2.131)×OUT(2)+(−1.096)×OUT(1)+(−1.894)×OUT(0)".

After the sum is calculated at step S22, a transform function procedure is executed, based on the calculated sum, as shown in FIG. 9 in a similar manner to that described above in relation to FIG. 8a.

After completing the above transform function procedure, the determination procedure returns to step S24. At step S24, the sum is derived again by calculating "1.328+(−2.438)×OUT(0)" based on the derived output value OUT(0).

At step S25, the above-mentioned transform function procedure is executed again to derive an output value for OUT(0). Thereafter, a final output value for OUT(1) is derived at step S26 by calculating "(−60)+OUT(0)×500" based on the derived output value OUT(0).

After obtaining the final output value for OUT(1), it is determined at step S27 whether the hub size is a large hub size or a small hub size. If the hub size is small, it is determined in step S28 whether or not the final output value for OUT(1) is not more than 100 (OUT(1)≦100). Where the final output value for OUT(1) is not more than 100, it is determined at step S29 that the current position of the video tape corresponds to the leading end of the video tape. The determination procedure then returns to step S5 (FIG. 7).

If it is determined in step S27 that the hub size is large, it is determined in step S30 whether or not the final output value for OUT(1) is more than 110 (OUT(1)≦110). Where the final output value for OUT(1) is not more than 110, it is determined at step S31 that the current position of the video tape corresponds to the leading end of the video tape. The determination procedure then returns to step S5 (FIG. 7).

Based on the current position of the video tape determined in the above-mentioned determination procedure, it is determined at step S5 whether or not the current position of the video tape corresponds to the leading or trailing end of the video tape.

When it is determined at step S5 that the current position of the video tape corresponds to neither the leading nor trailing end of the video tape, the procedure returns to step S3 in order to repeatedly execute the operation for determining the current position of the video tape.

When it is determined at step SS that the current position of the video tape corresponds to the leading or trailing end of the video tape, the high-speed running of the video tape is stopped at step S6. In this state, a reproducing operation is carried out.

For instance, where it is currently determined that the video tape runs forwardly, a forward reproduction operation such as a normal-speed play or forward fast search is carried out.

Where it is currently determined that the video tape runs reversely, a reverse reproduction operation such as a reverse play or reverse fast search is carried out.

Next, at step S7, it is determined whether or not any signal is reproduced from the video tape. That is, it is determined whether or not at least one of three signals, namely, video, audio and control signals recorded on the video tape, is reproduced.

When it is determined at step S7 that there is a signal reproduced from the video tape, it is determined that the video tape has not run yet to its leading or trailing end. In this case, the reproducing operation is continued.

When it is determined at step S7 that there is no signal reproduced from the video tape, it is determined that the video tape has run to its leading or trailing end. In this case, the reproducing operation is stopped.

On the other hand, where it is determined at step S2 that the reproducing operation is carried out, it is determined at step S7 whether or not any signal is reproduced from the video tape. When there is a signal reproduced from the video tape, the reproducing operation is continued because the video tape has not run yet to its leading or trailing end. When there is no signal reproduced from the video tape, the reproducing operation is stopped at step S8 because the video tape has run to its leading or trailing end.

As is apparent from the above description, in accordance with the present invention, the number of CFG signals generated for the current one revolution of the reel is inputted to a neural fuzzy algorithm so as to extract a neural fuzzy function in accordance with a learning procedure.

Where the video tape runs at a high speed, a counting operation is carried out to count the number of CFG signals generated for the current one revolution of the reel, the number of CFG signals generated for one revolution of the reel preceding the current one revolution of the reel by one revolution, and the number of CFG signals generated for one revolution of the reel preceding the current one revolution of the reel by two revolutions. All the counted numbers of CFG signals are inputted to the extracted neural fuzzy function, thereby detecting whether or not the video tape has run to its leading or trailing end. When it is determined that the video tape has run to its leading or trailing end, it is determined whether or not there is any signal reproduced from the video tape while executing the reproducing operation. When there is no reproduced signal, the reproducing operation is stopped. Thus, the present invention achieves an accurate detection for the leading and trailing ends of the video tape.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for detecting leading and trailing ends of a video tape, comprising the steps of:

determining whether or not the video tape is running at a high speed;

counting the number of capstan frequency generator (CFG) signals for a current revolution of a reel adapted to run the video tape, when it is determined that the video tape is running at a high speed;

inputting the counted number of CFG signals to a neural fuzzy function previously extracted in accordance with a learning procedure, thereby determining whether or not the video tape has run to the leading or trailing end thereof;

executing a reproduction operation for the video tape when it is determined that the video tape has run to the leading or trailing end thereof, and determining whether or not any signal is reproduced from the video tape during the reproduction operation; and stopping the running of the video tape when it is determined that there is no signal reproduced from the video tape during the reproduction operation.

2. The method in accordance with claim 1, wherein the counting step comprises the step of counting the number of CFG signals generated for the current one revolution of the reel, the number of CFG signals generated for one revolution of the reel preceding the current one revolution of the reel by one revolution, and the number of CFG signals generated for one revolution of the reel preceding the current one revolution of the reel by two revolutions.

3. The method in accordance with claim 1, wherein the counting step is executed for CFG signals generated for one revolution of a supply reel when the video tape runs forwardly at a high speed, while being executed for CFG signals generated for one revolution of a take-up reel when the video tape runs reversely at a high speed.

4. The method in accordance with claim 1, wherein the counting step is executed for CFG signals generated for one revolution of a supply reel when the video tape runs forwardly at a high speed, while being executed for CFG signals generated for one revolution of a take-up reel when the video tape runs reversely at a high speed.

5. The method in accordance with claim 1, wherein the step of determining whether or not any signal is reproduced from the video tape comprises the step of determining whether or not any signal is reproduced from the video tape while executing a normal-speed reproduction operation, when the video tape runs forwardly at a high speed.

6. The method in accordance with claim 1, wherein the step of determining whether or not any signal is reproduced from the video tape comprises the step of determining whether or not any signal is reproduced from the video tape while executing a forward fast search operation, when the video tape runs forwardly at a high speed.

7. The method in accordance with claim 1, wherein the step of determining whether or not any signal is reproduced from the video tape comprises the step of determining whether or not any signal is reproduced from the video tape while executing a reverse reproduction operation, when the video tape runs reversely at a high speed.

8. The method in accordance with claim 1, wherein the step of determining whether or not any signal is reproduced from the video tape comprises the step of determining whether or not any signal is reproduced from the video tape while executing a reverse fast search operation, when the video tape runs reversely at a high speed.

9. The method in accordance with claim 1, wherein the step of stopping the running of the video tape comprises the step of stopping the running of the video tape when none of video, audio and control signals recorded on the video tape are reproduced during the reproduction operation.

* * * * *